United States Patent [19]

Zima et al.

[11] 4,239,672

[45] Dec. 16, 1980

[54] AQUEOUS COATING EMULSIONS AND PROCESS FOR PRODUCING SAME

[75] Inventors: Herbert Zima; Gert Dworak, both of Graz, Austria

[73] Assignee: Vianova Kunstharz, A.G., Werndorf, Austria

[21] Appl. No.: 33,804

[22] Filed: Apr. 26, 1979

[30] Foreign Application Priority Data

Apr. 27, 1978 [AT] Austria .................................. 3022/78

[51] Int. Cl.$^3$ ............................................ C08L 47/00
[52] U.S. Cl. .............................. 260/29.7 H; 428/462; 526/272
[58] Field of Search .................................. 260/29.7 H

[56] References Cited

U.S. PATENT DOCUMENTS

| | | | |
|---|---|---|---|
| 2,933,468 | 4/1960 | Aldridge et al. | 260/29.7 H |
| 3,414,432 | 12/1968 | Mertzweiller et al. | 260/29.7 H |
| 3,609,111 | 9/1971 | Kumanotani | 260/29.7 H |
| 3,920,769 | 11/1975 | Yaginuma et al. | 260/29.7 H |
| 4,096,106 | 6/1978 | Kita | 260/29.7 H |
| 4,154,708 | 5/1979 | Araki et al. | 260/29.7 H |

*Primary Examiner*—Harry Wong, Jr.
*Attorney, Agent, or Firm*—A. W. Breiner

[57] ABSTRACT

Coating compositions which can be used for depositing a coating on a metal substrate by a chemical deposition process based on aqueous emulsions of adducts of alpha, beta-ethylenically unsaturated carboxylic acids to alkane diene polymers with an acid content corresponding to 12.5 to 25% by weight of maleic anhydride calculated on the adduct. The coating compositions on deposition provide films which have excellent recoatability, excellent corrosion resistance, and permit the elimination or a reduction in the amount of conventionally used additives in a chemical deposition bath. The coating compositions can be employed in other conventional coating processes.

17 Claims, No Drawings

AQUEOUS COATING EMULSIONS AND PROCESS FOR PRODUCING SAME

The invention is concerned with aqueous emulsions of adducts of alpha,beta-ethylenically unsaturated carboxylic acids to diene polymers; the process for producing the emulsions, and to a process for producing coating compositions based on the aqueous emulsions. The emulsions of the invention can be used for the production of coatings, particularly for the formation of corrosion-resistant coatings on metal surfaces by dipping the metal surfaces into the acidic aqueous emulsions.

It is known in the art that water-soluble binders based on diene polymers have gained great importance for the formulation of primers owing to the fact that diene polymers are unsaponifiable and afford excellent corrosion resistance. More specifically, from FR-PS Nos. 1,467,595 and 1,509,692 it is known to react polymers of dienes, particularly of butadiene, with maleic anhydride and to render the reaction products water soluble upon neutralization with bases. AT-PS Nos. 289,269, 295,692 and 303,920 describe water-soluble coating compositions consisting of combinations of optionally partially esterified adducts of maleic anhydride to diene polymers and condensation products of formaldehyde and phenol carboxylic acids and phenols, and optionally also polyhydroxy compounds with at least two hydroxy groups. According to DE-OS No. 20 16 223, diene polymers, in mixture with natural oils, are reacted with maleic anhydride to form polycarboxylic acid resins. A similar procedure, using alpha,beta-ethylenically unsaturated dicarboxylic acids, is described in U.S. Pat. No. 3,489,704.

From a number of references, including U.S. Pat. No. 3,592,699, DE-OS No. 26 12 995, and GB-PS Nos. 1,099,461; 1,241,991; 1,312,097; 1,349,826; 1,349,827 and 1,356,215, it is known to deposit coatings of acid latex baths on metal surfaces, particularly on iron, by immerging the cleaned iron objects into an about 10% polymer dispersion containing hydrofluoric acid as an etching agent for the iron surface and an oxidizing agent and/or an iron-(III)-salt. The presence of, or formation of iron-(III)-ions cause the latex to coagulate on the iron surface. These references disclose as the coating compositions polymer dispersions (latices) based on styrene-butadiene copolymers, acrylic copolymers, vinyl chloride copolymers, polyethylene and poly-tetrafluoroethylene. The essential disadvantage of this group of binders, for the deposition process as well as regarding the performance of the obtained coatings, is the rapid increase in the thickness of the film upon prolonged presence in the coating bath of the substrate and also the unsatisfactory recoatability, manifest in an insufficient adhesion of the further paint coatings applied to such films and in the relatively poor corrosion resistance of the coatings.

The present invention is concerned with new synthetic resin emulsions affording technical advantages over prior art polymer dispersions including excellent recoatability of the films; corrosion resistance considerably enhanced to that of latex dispersions, and the possibility to omit the usually employed treatment with chromic acid. Furthermore, the level of direct or indirect coagulating agent for the chemical deposition process can be reduced considerably. The value of the aforesaid advantages is evident to those skilled in the art. Recoatability, i.e., excellent adhesion of the subsequent coating, is a principal prerequisite for the use as primers of the coating compositions, and thus as the first layer of a multiple layer coating and essential for the corrosion protection of the entire system. There is no need any longer to stress the importance of enhanced corrosion protection. The omission of a post-treatment of the coating with chromic acid and the reduction in the level of the required additives means an essential advance towards simplification, reduction in cost, and improvement in ecology.

The process of the invention for the preparation of coating emulsions based on adducts of alpha,beta-ethylenically unsaturated carboxylic acids to polymers of dienes, which, in particular, may be deposited on metal substrates by a chemical deposition process from the acid containing emulsions, is characterized in that adducts of alpha,beta-ethylenically unsaturated carboxylic acids to homopolymers of alkane dienes and/or copolymers of such alkane dienes with other monomers, with an acid content corresponding to 12.5 to 25% by weight of maleic anhydride (calculated on the adduct), upon openaing of optionally present anhydride structures through hydrolysis or semi-ester formation with alcohols, optionally in the presence of anionic, and optionally in portions of non-ionic emulsifiers with simultaneous partial or total elimination of the organic solvents, are emulsified in water.

The preparation of the adducts of alpha,beta-ethylenically unsaturated carboxylic acids to dienes used according to the invention is known per se, as well as the suitable raw materials. However, the adducts used for the present process have to be selected according to certain principles, in order that optimum results are obtained. For obtaining an optimum in performance such alkanediene polymers are used, the microstructure and molecular weight of which have the following criteria:

50-100% 1,4-cis double bonds
50-0% 1,4-trans double bonds
20-0% 1,2-vinyl double bonds;

a molecular weight of 500-10,000 and preferably from 1000 to 5000. This group includes the homopolymers or copolymers of butadiene and pentadiene, the copolymers mainly being formulated of the mentioned alkane dienes. Cyclodienes, such as cyclopentadiene polymers or mixtures of various hydrocarbon resins susceptible to adduct formation in subordinate quantity, may be coemployed in the preparation of the adduct emulsions according to the present invention.

The "adduct strength," i.e., the ratio between carboxylic acid and diene polymer when using maleic anhydride as the dienophilic component, ranges between 1:3 and 1:7, corresponding to a portion of 25 to 12.5% by weight of maleic anhydride on total adduct. When using other acids such as acrylic acid, itaconic acid, etc., the resulting acid value range can be used as the criterion. The adducts are produced at temperatures of between 180° and 220° C. in the presence of inhibitors, such as diphenyl-p-phenylenediamine or 2,2'-methyl-bis-6-tertiary-butyl-4-methyl-phenol and with the exclusion of air oxygen to the greatest possible extent. In all cases a practically total reaction of the carboxylic acid is aimed at. When using carboxylic acid anhydrides, subsequently the anhydride structures are opened by reaction with water and/or partial esterification with alcohols, optionally in the presence of small amounts of solvents inert to anhydrides. For better handling, the adducts may be diluted with additional solvent, the solvent optionally being distilled off again on emulsification. Solvents suitable for diluting the adducts are those the boiling point of which is below that of water, or which form azeotropic blends with water, such as ethylacetate, methylethyl ketone, aliphatic hydrocarbon solvents and aromatic hydrocarbons, such as benzol or toluol.

The adducts can be emulsified in various ways. The solution of an adduct is slowly added with stirring to the warmed liquid containing water and the emulsifier, the solvent being distilled off continuously and optionally under vacuum. At the end of the addition, the remaining solvent is distilled off completely and the dispersion is cooled while being stirred. In this way very stable emulsions are obtained. Another method to produce aqueous dispersions of the adducts is to mix the adduct with the emulsifier; warm the mixture and add the water while stirring. Alternatively, the emulsifier is dissolved in water and is added with stirring to the warmed adduct. Or, adduct, emulsifier, and water are charged and heated, while being stirred, until all is emulsified. It is also in these cases advantageous to remove the solvents from the emulsion, to the greatest possible extent.

Examples of anionic emulsifiers suitable for use herein are sodium lauryl sulfate sodium tridecyl sulfate, dodecyl benzol sulfonate, the sodium salts of sulfated ethoxylated lauryl alcohol and tridecylalcohol, and sulfated polyethoxylated octylphenols and nonylphenols. In general it is not necessary to coemploy nonionic emulsifiers in the preparation of the emulsions of the invention. In some cases such compounds may be used as pigment wetting agents in the paint formulation.

For the use in coating metallic substrates according to the chemical deposition process, the adduct emulsions are blended with the reactants which release the deposition of the emulsions on the substrate. In general, such reactants are diluted aqueous solutions of hydrofluoric acid in combination with salts of polyvalent metals, particularly iron-(III)-salts. In comparison to the products known in the art, the quantity of the reactants triggering the deposition can be substantially reduced for the coating emulsions of the invention. The minimum quantity of these reactants is about 0.15%, calculated on the ready-to-use bath material, and the portion of hydrofluoric acid can be reduced to a minimum of 0.003% of the bath material. Into such solutions steel plates are dipped which have been degreased and optionally pretreated by the various phosphating methods, or other metal substrates, the surface of which can be attacked by the acidic medium of the bath, thereby forming polyvalent metal ions. Within the normal coating times of 60 to 180 seconds, films deposit on the substrate which are rinsed with water and cured at temperatures of from 160° to 190° C. The coatings obtained under these conditions have a film thickness of between 10 and 30 μm.

In a special embodiment of the coating process other resins are added to the emulsion bath or they are emulsified together with the diene adduct. The results are particularly advantageous, if, together with the adduct, as a further component, 1–50% by weight of a low molecular polydiene oil is emulsified, the olefinic double bonds of which have been partly epoxidized according to known methods. Through this measure the formation of the coating is greatly influenced such that upon stoving the films become more uniform and have a more uniform film thickness.

It is evident that the coating compositions of the invention—without the reactants as above noted which are necessary for the chemical deposition process—can also be used for conventional coating methods including dipping, spraying, flow coating, roller coating, etc., optionally coemploying crosslinkers such as phenolic or amine resins. For any coating method any normally used pigment, dye, or extender can be used. Although film cure is preferably effected at elevated temperature, air-drying coating compositions can also be formulated together with the known siccatives.

The following examples illustrate the invention. All percentages in the examples are by weight, if not otherwise stated; parts are by weight.

Preparation Of The Adducts Used In The Examples

A 1: 500 g of a liquid polybutadiene with a viscosity of $30 \pm 10\%$ mPa.s/20° C. (DIN 53 015), an iodine number of about 450 (ASTM D 2078) and having a microstructure of about 80% 1,4-cis-, 19% 1,4-trans-, and 1% 1,2-vinyl configuration, 0.1 g of diphenyl-p-phenylene diamine, and 100 g of maleic anhydride are charged to a three-necked reaction vessel and are heated to 200° C. within about 3 hours while refluxing and maintaining an inert gas duct. After about 4 hours of reaction time at 200° C., no free maleic anhydride can be traced. The batch is cooled to 90° C., hydrolyzed with 30 g of water, and diluted to 60% solids with 400 g of ethylacetate. The acid value is 160–180 mg KOH/g.

A 2: 600 g of a liquid butadiene homopolymer with a viscosity of $750 \pm 10\%$ mPa.s/20° C. (DIN 53 015), an iodine number of about 450 (ASTM 2078) and having a microstructure of about 70% 1,4-cis-, 28% 1,4-trans-, and 2% 1.2-vinyl configuration, 0.1 g diphenyl-p-phenylene diamine, and 100 g maleic anhydride are charged to a three-necked reaction vessel and are heated to 200° C. within about 3 hours while refluxing and maintaining an inert gas duct. After about 4 hours of reaction time at 200° C., no free maleic anhydride can be traced. The batch is cooled to 90° C., hydrolyzed with 30 g of water, and diluted to 80% solids with 167 g of ethylacetate. The acid value (resin solids) is 140–160 mg KOH/g.

A 3: 400 g of a liquid polybutadiene as used in example A2, 0.1 g of diphenyl-p-phenylene diamine, and 100 g of maleic anhydride are charged to a three-necked reaction vessel and are heated to 200° C. within about 3 hours while refluxing and maintaining an inert gas duct. After about 4 hours of reaction time at 200° C., no free maleic anhydride can be traced. The batch is cooled to 90° C., hydrolyzed with 30 g of water, and diluted to 70% solids with 210 g of toluol. The acid value (resin solids) is 180–210 mg KOH/g.

Example 1

A solution of 2.5 parts of sodium laurylsulfate in 280 parts of water is charged to a reaction vessel equipped with stirrer addition funnel, thermometer, reflux condensor, cooling and inert gas supply. 240 parts of a 50% solution of Adduct A1 in ethyl acetate are charged to the addition funnel. The liquid in the reaction vessel is heated to 80° C. and the resin solution is added in the course of 2 hours, while stirring the batch. The ethylacetate is continuously distilled off as quickly as possible. When all of the resin solution has been added, the remainder of the ethylacetate and a little water are distilled off. The emulsion is cooled while stirring. The emulsion has a solids content of about 32% and an average particle size of 1–2 μm.

Example 2

The equipment described in Example 1 is charged with a solution of 7.5 parts sodium laurylsulfate in 1500 parts of water and heated to 80° C. The addition funnel is charged with a blend of 667 parts of Adduct A1, 100 parts of an epoxidized polybutadiene, as hereinafter defined, and 483 parts of a hydrocarbon solvent with a boiling range of between 80° and 120° C. The blend is added in the course of 2 hours, while the solvents and some water are distilled off. A very fine seed-free emulsion is obtained having a solids content of about 30% and a maximum particle size of 0.5 $\mu$m. The epoxidized polybutadiene used in this Example has an epoxy oxygen content of about 8%. The polybutadiene had a viscosity of 750±10% mPa.s/20° C. (DIN 53 015), an iodine number of about 450±5% (ASTM D 2078), and a steric configuration of about 72% 1,4-cis-double bonds, about 27% 1,4-trans-double bonds, and about 1% of vinyl double bonds.

Example 3

100 parts of Adduct A 2, 1.5 parts of sodium laurylsulfate, and 240 parts water are charged to a reaction vessel. While stirring, the blend is heated. A fine particle size emulsion with about 30% solids results.

Example 4

100 parts of Adduct A3 are mixed with 1.5 parts of sodium laurylsulfate and charged to a reaction vessel. The blend is heated and 240 parts of hot water are continuously added, the toluol and a little water being distilled off simultaneously. An about 30% solids emulsion results.

Example 5

100 parts of an adduct prepared according to A1 but not diluted with ethyl acetate, 2.4 parts of dodecylbenzolsulfonate, and 240 parts of water are charged to a reaction vessel. While stirring, the batch is heated until an about 30% emulsion forms.

Application Of The Emulsions Of The Invention In The Chemical Deposition Process (I) A paint bath is prepared employing the emulsion prepared according to Example 1 by admixing 50 parts of the emulsion with vigorous stirring with a blend of 100 parts of an aqueous solution of hydrofluoric acid and iron-(III)-fluoride, containing 0.5% of hydrofluoric acid and 0.5% of iron-(III)-fluoride. A cleaned and degreased steel panel is immersed into this bath, while the liquid is slightly moved. With an immersion time of 90 to 300 seconds a coating forms on the panel, the thickness of which will not rise with longer dwelling time in the bath. The coated panel is rinsed with deionized water and cured at 170° C. for 30 minutes. The dry film thickness is 10-12 $\mu$m.

(II) 50 parts of a 0.25% aqueous solution of hydrofluoric acid are mixed with 50 parts of a 0.25% aqueous solution of iron-(III)-fluoride and 50 parts of the 30% emulsion of Example 2 are stirred in. A well cleaned and degreased steel panel is immersed into this bath, while the liquid is slowly moved. With a deposition time of 30 seconds a 15-18 $\mu$m resin coating deposits on the panel, with a deposition time of 90 seconds the coating is from 25-30 $\mu$m thick. The coating is rinsed with deionized water and cured for 15 minutes at 180° C. The panels exposed to a salt spray test according to ASTM B 117-64 after 400 hours show an underrusting of 8 mm at the cross incision.

(III) In 100 parts of a paint bath prepared from an emulsion according to Example 2, and containing 0.003% hydrofluoric acid, 0.157% of iron-(III)-fluoride and 10% of emulsified synthetic resin, 16.5 parts of a 30% dispersion of carbon black, containing 4% of a non-ionic emulsifier (Derussol A 300), are dispersed. Zinc phosphated and iron phosphated steel plates are immersed therein. With a deposition time of 120 seconds uniform black films with a thickness of 20-22 $\mu$m deposit. They are allowed to pre-dry for a short while and are then stoved for 15 minutes at 180° C. The obtained films can be recoated with a solvent- or water-borne filler or finish, affording excellent adhesion. Corrosion resistance in the salt spray test according to ASTM B 117-64 is also excellent. Exposure for 500 hours with both methods of pretreatment resulted in corrosion of about 8 mm at or under the cross incision.

As will be apparent to one skilled in the art, various modifications can be made within the scope of the aforesaid description. Such modifications being within the ability of one skilled in the art form a part of the present invention and are embraced by the appended claims.

It is claimed:

1. A coating composition comprising an acidic, anionic emulsifying agent containing aqueous emulsion of an adduct of an alpha,beta-ethylenically unsaturated carboxylic acid to an alka-diene polymer having a micro-structure of 50 to 100% of 1,4-cis-, 0-50% of 1,4-trans-, and 0-50% of 1,2-vinylconfiguration, and an average molecular weight of between 500 and 10,000 (measured by vapor pressure osmosis), said adduct having an acid content calculated in maleic anhydride units of 12.5 to 25% by weight of the adduct.

2. The coating composition of claim 1 wherein the alka-diene polymer is a homopolymer.

3. The coating composition of claim 1 wherein the alka-diene polymer is a copolymer of an alka-diene in a major amount and at least one additional monomer in a minor amount.

4. The coating composition of claim 1 wherein the emulsion has a solids content in excess of about 25%.

5. The coating composition of claim 1 wherein the alpha,beta-ethylenically unsaturated acid is maleic acid.

6. The coating composition of claim 1 wherein the alpha,beta-ethylenically unsaturated acid is acrylic acid.

7. The coating composition of claim 1 wherein the alkane diene polymer has a molecular weight of between about 1000 and about 5000.

8. The coating composition of claim 1 wherein the alka-diene polymer is polybutadiene.

9. The coating composition of claim 1 wherein the alka-diene polymer is polypentadiene.

10. The coating composition of claim 1 wherein the alka-diene polymer includes minor amounts of cyclodienes and/or other adducting hydrocarbon resins.

11. The coating composition of claim 1 including blended therein at least 0.15% by weight, calculated on a ready-to-use chemical deposition paint bath, of at least one coagulating reactant.

12. The coating composition of claim 11 including blended therein at least 0.003% by weight, calculated on a ready-to-use chemical deposition paint bath, of hydrofluoric acid.

13. The coating composition of claim 1 including minor amounts of an organic solvent.

14. Process for preparing an acidic, anionic emulsifying agent for use in a coating composition containing an aqueous emulsion of an adduct of an alpha,beta-ethylenically unsaturated carboxylic acid to an alka-diene polymer having a micro-structure of 50 to 100% of 1,4-cis-, 0–50% of 1,4-trans-, and 0–50% of 1,2-vinyl-configuration, and an average molecular weight of between 500 and 10,000 (measured by vapor pressure osmosis), said adduct having an acid content calculated in maleic anhydride units of 12.5 to 25% by weight of the adduct comprising (a) providing an adduct of alpha,beta-ethylenically unsaturated carboxylic acids to alka-diene polymers, said adduct having an acid content corresponding to 12.5 to 25% by weight of maleic anhydride; and (b) forming an emulsion of said adduct in water.

15. The process of claim 14 wherein said emulsification is carried out in the presence of other resins.

16. The process of claim 14 including the step of blending with said emulsion at least about 0.15% by weight, calculated on a ready-to-use chemical deposition paint bath, of at least one coagulating reactant.

17. The process of claim 16 including the step of blending with said emulsion at least about 0.003% by weight, calculated on a ready-to-use chemical deposition paint bath, of hydrofluoric acid.

* * * * *